(12) United States Patent
Yahagi (10) Patent No.: US 8,294,711 B2
(45) Date of Patent: Oct. 23, 2012

(54) DEVICE, METHOD, AND PROGRAM FOR THREE-DIMENSIONAL IMAGING BY REDUCING OR ELIMINATING PARALLAX DURING A ZOOM OPERATION

(75) Inventor: Kouichi Yahagi, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/120,566

(22) PCT Filed: Sep. 9, 2009

(86) PCT No.: PCT/JP2009/004458
§ 371 (c)(1),
(2), (4) Date: Mar. 23, 2011

(87) PCT Pub. No.: WO2010/035413
PCT Pub. Date: Apr. 1, 2010

(65) Prior Publication Data
US 2011/0175910 A1 Jul. 21, 2011

(30) Foreign Application Priority Data
Sep. 24, 2008 (JP) ................................. 2008-243825

(51) Int. Cl.
*G06T 15/00* (2011.01)
(52) U.S. Cl. ..................................................... 345/419
(58) Field of Classification Search ........................ None
See application file for complete search history.

(56) References Cited

U.S. PATENT DOCUMENTS

| 6,512,892 | B1 | 1/2003 | Montgomery et al. | |
|---|---|---|---|---|
| 6,559,813 | B1 * | 5/2003 | DeLuca et al. | 345/8 |
| 7,605,776 | B2 * | 10/2009 | Satoh et al. | 345/9 |
| 2001/0019450 | A1 * | 9/2001 | Ogino | 359/462 |
| 2004/0004616 | A1 * | 1/2004 | Konya et al. | 345/419 |
| 2005/0134709 | A1 * | 6/2005 | Ishii et al. | 348/240.99 |
| 2007/0236560 | A1 * | 10/2007 | Lipton et al. | 348/43 |

FOREIGN PATENT DOCUMENTS

| JP | 08-009421 A | 1/1996 |
|---|---|---|
| JP | 10-070740 A | 3/1998 |
| JP | 2001-142166 A | 5/2001 |
| JP | 2002-223384 A | 8/2002 |
| JP | 2005-039401 A | 2/2005 |
| JP | 2005-167310 A | 6/2005 |
| JP | 2006-162991 A | 6/2006 |

* cited by examiner

*Primary Examiner* — Daniel Hajnik
(74) *Attorney, Agent, or Firm* — Sughrue Mion, PLLC (57) ABSTRACT

Two or more images having a parallax therebetween are obtained by imaging a subject from different positions using imaging units. Three-dimensional processing for three-dimensional display is applied to the two or more images, and the two or more images are displayed on a display unit. While the imaging units carry out a zoom operation, three-dimensional display with a reduced parallax between the two or more images or two-dimensional display is performed.

7 Claims, 5 Drawing Sheets

DEVICE, METHOD, AND PROGRAM FOR THREE-DIMENSIONAL IMAGING BY REDUCING OR ELIMINATING PARALLAX DURING A ZOOM OPERATION

CROSS REFERENCE TO RELATED APPLICATIONS

This application is a National Stage of International Application No. PCT/JP2009/004458 filed on Sep. 9, 2009, which claims priority from Japanese Patent Application No. 2008-243825, filed on Sep. 24, 2008, the contents of all of which are incorporated herein by reference in their entirety.

BACKGROUND OF THE INVENTION

1. Field of the Invention

The present invention relates to a three-dimensional imaging device and a three-dimensional imaging method for obtaining two or more images to be used for three-dimensional display by imaging a subject from different positions, as well as a program for causing a computer to carry out the three-dimensional imaging method.

2. Description of the Related Art

It has been known that stereoscopic viewing using a parallax can be achieved by combining two or more images and three-dimensionally displaying the combined images. Such stereoscopic viewing can be provided by taking two or more images of the same subject from different positions using two or more cameras, and three-dimensionally displaying the two or more images by using a parallax between the subject images contained in the images.

Specifically, if the stereoscopic viewing is achieved by parallel viewing with naked eyes, the three-dimensional display can be achieved by arranging the images side by side. Further, the three-dimensional display may be achieved by combining the images, for example, by overlapping the images with providing the images with different colors, such as red and blue, or by overlapping the images with providing the images with different polarization directions. In these cases, the stereoscopic viewing can be achieved by using image separating glasses, such as red-and-blue glasses or polarization glasses, to provide a merged view of the three-dimensionally displayed images, which is attained via the automatic focusing function of the eyes (anaglyph system, polarization filter system).

The stereoscopic viewing can also be achieved without using the polarization glasses, or the like, by displaying the images on a three-dimensional display monitor which can provide stereoscopic viewing, such as a monitor of a parallax barrier system or a lenticular system. In this case, the three-dimensional display is achieved by cutting the images into vertical strips and alternately arranging the vertical strips of the images. Moreover, a system for providing the three-dimensional display by alternately displaying left and right images with changing directions of light beams from the left and right images through the use of image separation glasses or by attaching an optical element on the liquid crystal display has been proposed (scanning backlight system).

Further, stereoscopic cameras provided with two or more imaging units to carry out imaging for the above-described three-dimensional display have been proposed. This type of stereoscopic camera includes two or more imaging units disposed apart from each other by a predetermined distance and generates an image for three-dimensional display from the images obtained by the two or more imaging units. The thus generated image for three-dimensional display can be three-dimensionally displayed on a monitor. In addition, a method for use with this type of stereoscopic camera for successfully providing stereoscopic viewing by changing positions of the two or more images depending on a parallax level between corresponding areas in the two or more images has been proposed (see Japanese Unexamined Patent Publication No. 8 (1996)-009421, hereinafter "Patent Document 1").

In the case where imaging is carried out using the stereoscopic camera, a live view image is three-dimensionally displayed on the monitor before the release button is pressed. At this time, an angle of view to be imaged can be changed using a zoom function of each imaging unit. In this case, the photographer can image a subject at a desired size by making a zoom control operation on the stereoscopic camera while viewing the three-dimensionally displayed live view image.

As described above, when the stereoscopic camera carries out a zoom operation, the angle of view is changed. During the zoom operation, the subject may often be out of focus. Further, since the stereoscopic camera includes the two or more imaging units, the zoom operation is carried out synchronously at the two or more imaging units. However, due to individual variability of a motor and a mechanism for performing the zoom function at each imaging unit, it is very difficult to achieve completely synchronous zoom operation at the imaging units. The three-dimensional display uses optical illusion to stereoscopically display the images. Therefore, when the zoom operation is carried out while the live view image is three-dimensionally displayed, the subject may be out of focus or the angle of view may vary at each imaging unit. Thus, during the zoom operation, the stereoscopic effect of the three-dimensionally displayed image may change or the stereoscopic effect may appear or disappear, and this makes it very hard to perform stereoscopic viewing.

SUMMARY OF THE INVENTION

In view of the above-described circumstances, the present invention is directed to alleviating uncomfortable feeling felt when stereoscopic viewing cannot be performed during a zoom operation when two or more images are taken for three-dimensional display.

A three-dimensional imaging device according to the invention includes:

two or more imaging means for obtaining two or more images having a parallax therebetween by imaging a subject from different positions, the two or more imaging means having an optical zoom function;

three-dimensional processing means for applying three-dimensional processing for three-dimensional display to the two or more images;

display means for carrying out various types of display including three-dimensional display of the two or more images; and display control means for carrying out three-dimensional display with a reduced parallax between the two or more images or two-dimensional display while the imaging means carry out a zoom operation.

The "three-dimensional display with a reduced parallax" refers to three-dimensional display carried out with reducing a stereoscopic effect, which has been felt while the three-dimensionally displayed image is viewed before the zoom operation, and the "two-dimensional display" refers to display with no stereoscopic effect, i.e., with no parallax.

In the three-dimensional imaging device according to the invention, the three-dimensional processing means may carry out the three-dimensional processing with a reduced parallax while the imaging means carry out the zoom operation.

The three-dimensional display with a reduced parallax or the two-dimensional display may be achieved by reducing a distance between the two or more imaging means.

In the three-dimensional imaging device according to the invention, in a case where an object is three-dimensionally displayed with being superposed on the three-dimensionally displayed image, the display control means may carry out three-dimensional display with a reduced parallax or two-dimensional display of the object while the imaging means carry out the zoom operation.

The object herein refers to an image displayed on the display means other than images obtained through imaging. Specifically, examples of the object includes imaging conditions, such as F value and shutter speed, the number of images taken and imaging time and date, icons representing modes, such as image stabilizing mode, flash on/off, person mode, etc., pictograms, and menus for various operations.

The three-dimensional imaging device according to the invention may further include notification means for notifying that the three-dimensional display with a reduced parallax or the two-dimensional display is being carried out.

In the three-dimensional imaging device according to the invention, the display control means may gradually reduce the parallax after the zoom operation is started until the parallax becomes 0 to finally carry out the two-dimensional display.

In the three-dimensional imaging device according to the invention, the display control means may gradually reduce the parallax after the zoom operation is started until the parallax becomes a predetermined parallax to finally carry out the three-dimensional display with a reduced parallax.

A three-dimensional imaging method according to the invention is a three-dimensional imaging method for use with a three-dimensional imaging device including two or more imaging means for obtaining two or more images having a parallax therebetween by imaging a subject from different positions, the two or more imaging means having an optical zoom function, three-dimensional processing means for applying three-dimensional processing for three-dimensional display to the two or more images, and display means for carrying out various types of display including three-dimensional display of the two or more images, the method including:

carrying out three-dimensional display with a reduced parallax between the two or more images or two-dimensional display while the imaging means carry out a zoom operation.

The three-dimensional imaging method according to the invention may be provided in the form of a program for causing a computer to carry out the three-dimensional imaging method.

According to the invention, while the imaging means carry out the zoom operation, the three-dimensional display with a reduced parallax between the two or more images or the two-dimensional display is carried out. Therefore, when the photographer makes a zoom control operation, the stereoscopic effect of the three-dimensional display can be reduced. In this manner, even when stereoscopic viewing cannot be performed during the zoom operation, variation of the stereoscopic effect is smaller, thereby alleviating the uncomfortable feeling felt during the zoom operation. In particular, by carrying out three-dimensional display with no stereoscopic effect by reducing the parallax to 0, i.e., two-dimensional display, no variation of stereoscopic effect occurs during the zoom operation, thereby reliably alleviating the uncomfortable feeling felt during the zoom operation.

Further, by carrying out the three-dimensional processing with a reduced parallax while the imaging means carry out the zoom operation, the reduction of stereoscopic effect can be achieved without increasing the components of the device, thereby preventing the device configuration from being complicated.

Furthermore, in the case where an object is three-dimensionally displayed with being superposed on the three-dimensionally displayed image, the object may be three-dimensionally displayed with a reduced parallax or two-dimensionally displayed while the imaging means carry out the zoom operation. Thus, the stereoscopic effect of the object in the three-dimensional display can be reduced when the photographer makes a zoom control operation. In this manner, even when stereoscopic viewing cannot be performed during the zoom operation, variation of the stereoscopic effect of the object is smaller, thereby alleviating the uncomfortable feeling felt during the zoom operation.

Moreover, by notifying that the three-dimensional display with a reduced parallax or the two-dimensional display is being carried out, the photographer can recognize based on the notification that the three-dimensional display with a reduced parallax or the two-dimensional display is being carried out.

In addition, by gradually reducing the parallax after the zoom operation is started until the parallax becomes 0 to finally carry out the two-dimensional display, or gradually reducing the parallax after the zoom operation is started until the parallax becomes a predetermined parallax to finally carry out the three-dimensional display with a reduced parallax, abrupt change of the stereoscopic effect when the zoom operation is started can be prevented, thereby achieving further alleviation of the uncomfortable feeling.

DESCRIPTION OF THE PREFERRED EMBODIMENTS

Figure 1:
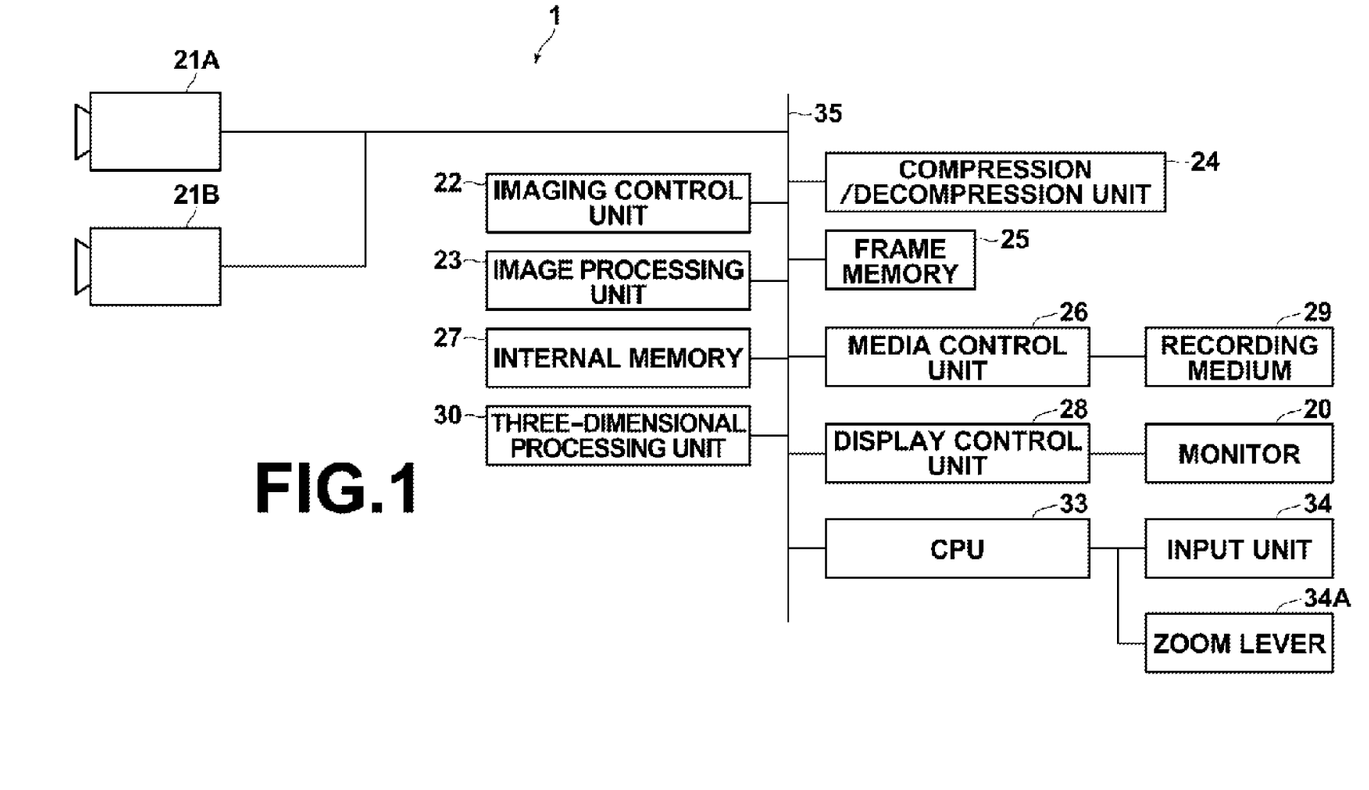
FIG. 1 is a schematic block diagram illustrating the internal configuration of a stereoscopic camera, to which a three-dimensional imaging device according to an embodiment of the present invention is applied.

Hereinafter, an embodiment of the present invention will be described with reference to the drawings. FIG. 1 is a schematic block diagram illustrating the internal configuration of a stereoscopic camera, to which a three-dimensional imaging device according to the embodiment of the invention is applied. As shown in FIG. 1, the stereoscopic camera 1 according to this embodiment includes two imaging units 21A and 21B, an imaging control unit 22, an image processing unit 23, a compression/decompression unit 24, a frame memory 25, a media control unit 26, an internal memory 27, and a display control unit 28. The imaging units 21A and 21B are positioned to be able to photograph a subject with a predetermined baseline length and a convergence angle.

Figure 2:
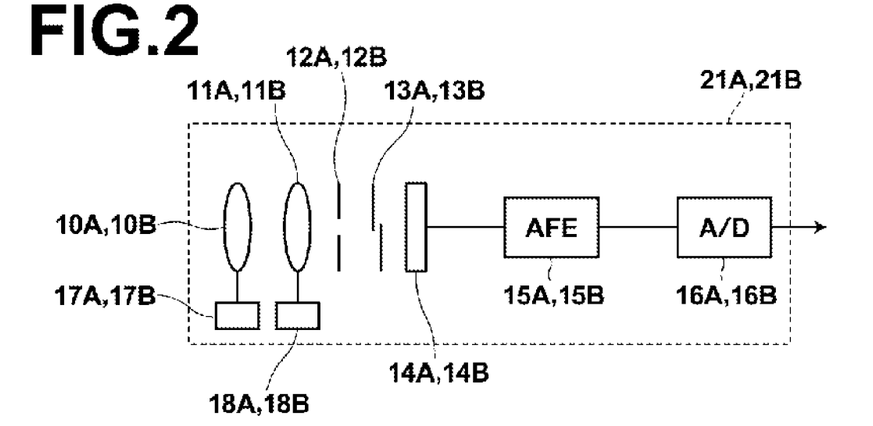
FIG. 2 is a diagram illustrating the configuration of an imaging unit.

FIG. 2 illustrates the configuration of the imaging units 21A and 21B. As shown in FIG. 2, the imaging units 21A and 21B include focusing lenses 10A and 10B, zoom lenses 11A and 11B, aperture diaphragms 12A and 12B, shutters 13A and 13B, CCDs 14A and 14B, analog front ends (AFE) 15A and 15B and A/D converting units 16A and 16B, respectively. The imaging units 21A and 21B further include focusing lens driving units 17A and 17B for driving the focusing lenses 10A and 10B and zoom lens driving units 18A and 18B for driving the zoom lenses 11A and 11B.

The focusing lenses 10A and 10B are used to focus on the subject, and are movable along the optical axis directions by the focusing lens driving units 17A and 17B, each of which is formed by a motor and a motor driver. The focusing lens driving units 17A and 17B control the movement of the focusing lenses 10A and 10B based on focus data obtained through AF processing, which will be described later, carried out by the imaging control unit 22.

The zoom lenses 11A and 11B are used to achieve a zoom function, and are movable along the optical axis directions by the zoom lens driving units 18A and 18B, each of which is formed by a motor and a motor driver. The zoom lens driving units 18A and 18B control the movement of the zoom lenses 11A and 11B based on zoom data obtained at the CPU 33 upon operation of a zoom lever.

Aperture diameters of the aperture diaphragms 12A and 12B are adjusted by an aperture diaphragm driving unit (not shown) based on aperture value data obtained through AE processing carried out by the imaging control unit 22.

The shutters 13A and 13B are mechanical shutters, and are driven by a shutter driving unit (not shown) according to a shutter speed obtained through the AE processing.

Each of the CCDs 14A and 14B includes a photoelectric surface, on which a large number of light-receiving elements are arranged two-dimensionally. Light from the subject is focused on each photoelectric surface and is subjected to photoelectric conversion to provide an analog imaging signal. Further, a color filter formed by regularly arranged R, G and B color filters is disposed on the front side of each CCD 14A, 14B.

The AFEs 15A and 15B process the analog imaging signals fed from the CCDs 14A and 14B to remove noise from the analog imaging signals and adjust gain of the analog imaging signals (this operation is hereinafter referred to as "analog processing").

The A/D converting units 16A and 16B convert the analog imaging signals, which have been subjected to the analog processing by the AFEs 15A and 15B, into digital signals. The image represented by digital image data obtained by the imaging unit 21A is referred to as a first image G1, and the image represented by digital image data obtained by the imaging unit 21B is referred to as a second image G2.

The imaging control unit 22 includes an AF processing unit and an AE processing unit (not shown). When a release button included in the input unit 34 is half-pressed, the imaging units 21A and 21B obtain preliminary images, and the AF processing unit determines focused areas and focal positions for the lenses 10A and 10B based on the preliminary images, and outputs them to the imaging units 21A and 21B. The AE processing unit determines an aperture value and a shutter speed based on the preliminary images, and outputs them to the imaging units 21A and 21B.

As the method used to detect the focal points through the AF processing, a passive method may be used, for example. In the passive method, the focus position is detected based on characteristics that an image containing a desired subject being focused has a higher contrast value. More specifically, each preliminary image is divided into a plurality of AF areas, and an image in each AF area is filtered using a high-pass filter. Then, an AF evaluation value is calculated for each AF area, and the AF area having the highest evaluation value, i.e., the highest output value from the filter, is detected as the focused area.

When the release button is fully pressed, the imaging control unit 22 instructs the imaging units 21A and 21B to carry out actual imaging to obtain actual images of the first and second images G1 and G2. It should be noted that, before the release button is operated, the imaging control unit 22 instructs the imaging unit 21A to successively obtain a live view image, which has fewer pixels than the first and second images G1 and G2, at a predetermined time interval (for example, at an interval of 1/30 seconds) for checking imaging range of the imaging unit 21A.

It should be noted that the imaging control unit 22 also carries out the AF processing while the live view image is taken. The AF processing in this case is achieved by a simpler calculation than the AF processing based on the preliminary images.

The image processing unit 23 applies image processing, such as white balance adjustment, tone correction, sharpness correction and color correction, to the digital image data of the first and second images G1 and G2 obtained by the imaging units 21A and 21B. In this description, the first and second images which have been processed by the image processing unit 23 are also denoted by the same reference symbols G1 and G2 as the unprocessed first and second images.

The compression/decompression unit 24 applies compression processing according to a certain compression format, such as JPEG, to the image data representing an image for three-dimensional display, which is generated, as will be described later, from the actual images of the first and second images G1 and G2 processed by the image processing unit 23, and generates a three-dimensional image file used for three-dimensional display. The three-dimensional image file contains the image data of the first and second images G1 and G2 and the image data of the image for three-dimensional display. A tag storing associated information, such as photographing time and date, is added to the image file based on the Exif format, or the like.

The frame memory 25 is a work memory used to carry out various types of processing, including the above-described processing carried out by the image processing unit 23, applied to the image data representing the first and second images G1 and G2 obtained by the imaging units 21A and 21B.

The media control unit 26 accesses a recording medium 29 and controls writing and reading of the three-dimensional image file, etc.

The internal memory 27 stores various constants to be set in the stereoscopic camera 1, a program executed by the CPU 33, etc.

The display control unit 28 causes the first and second images G1 and G2 stored in the frame memory 25 during imaging to be two-dimensionally displayed on the monitor 20, or causes the first and second images G1 and G2 recorded in the recording medium 29 to be two-dimensionally displayed on the monitor 20. The display control unit 28 is also able to cause the first and second images G1 and G2, which have been subjected to the three-dimensional processing, as will be described later, to be three-dimensionally displayed on the monitor 20, or to cause the three-dimensional image file recorded in the recording medium 29 to be three-dimensionally displayed on the monitor 20. Switching between the two-dimensional display and the three-dimensional display may automatically be carried out, or may be carried out according to instructions from the photographer via the input unit 34, which will be described later. During the three-dimensional display, a live view image of the first and second images G1 and G2 is three-dimensionally displayed on the monitor 20 until the release button is pressed.

It should be noted that, when the display mode is switched to three-dimensional display, both the first and second images G1 and G2 are used for the display, as will be described later. In contrast, when the display mode is switched to two-dimensional display, one of the first and second images G1 and G2 is used for the display. In this embodiment, the first image G1 is used for the two-dimensional display.

Further, when the imaging units 21A and 21B carry out the zoom operation during three-dimensional display of the live view image, as will be described later, the display control unit 28 switches the display to two-dimensional display.

The stereoscopic camera 1 according to this embodiment further includes a three-dimensional processing unit 30. The three-dimensional processing unit 30 applies the three-dimensional processing to the first and second images G1 and G2 to allow three-dimensional display of the first and second images G1 and G2 on the monitor 20. The three-dimensional display technique used in this embodiment may be any of known techniques. For example, the stereoscopic viewing may be achieved by parallel viewing with naked eyes by displaying the first and second images G1 and G2 side by side, or the three-dimensional display may be achieved using a lenticular system, where a lenticular lens is attached on the monitor 20, and the images G1 and G2 are displayed at predetermined positions on the display surface of the monitor 20 so that the first and second images G1 and G2 are respectively viewed by the left and right eyes. Further, which the three-dimensional display may be achieved using a scanning backlight system, where optical paths of backlights of the monitor 20 are optically separated correspondingly to the left and right eyes in an alternate manner, and the first and second images G1 and G2 are alternately displayed on the display surface of the monitor 20 synchronously with the separation of the backlights to the left or the right.

The three-dimensional processing unit 30 applies the three-dimensional processing depending on the type of three-dimensional display to the first and second images G1 and G2. For example, if the three-dimensional display is achieved by parallel viewing with naked eyes, the three-dimensional processing is achieved by generating a stereoscopic image by arranging the first and second images G1 and G2 side by side on the left and right is carried out. If the three-dimensional display is achieved with a lenticular system, the three-dimensional processing is achieved by generating a stereoscopic image by cutting the first and second images G1 and G2 into vertical strips and alternately arranging the vertical strips of the images. If the three-dimensional display is achieved with a scanning backlight system, three-dimensional processing to alternately output the first and second images G1 and G2 to the monitor 20 synchronously with separation of backlights of the monitor 20 to the left and right is carried out.

The monitor 20 is modified according to the type of the three-dimensional processing carried out by the three-dimensional processing unit 30. For example, if the system of the three-dimensional display is a lenticular system, a lenticular lens is attached on the display surface of the monitor 20. If the system of the three-dimensional display is a scanning backlight system, an optical element for changing directions of the light beams from the left and right images is attached on the display surface of the monitor 20.

Figure 3:
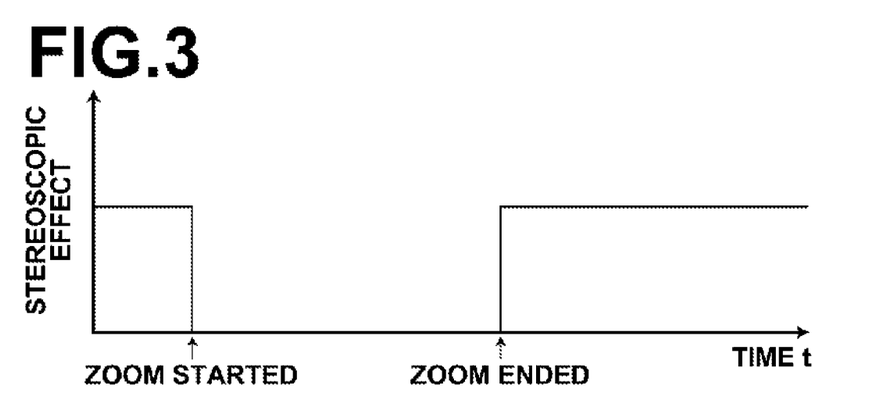
FIG. 3 is a diagram illustrating stereoscopic effects when display is switched.

In this embodiment, when the photographer makes a zoom control operation using a zoom lever 34A while the live view image of the first and second images G1 and G2 is displayed, the imaging units 21A and 21B carryout a zoom operation, and the display control unit switches the display from three-dimensional display to two-dimensional display. Specifically, in place of the image for three-dimensional display generated by the three-dimensional processing unit 30, the first image G1 is displayed on the monitor 20. In this case, driving of the imaging unit 21B may be stopped so that only the imaging unit 21A images the subject to obtain the first image G1. It should be noted that, at the three-dimensional processing unit 30, an image for two-dimensional display may be generated by morphing the first and second images G1 and G2 so that a parallax between subject images contained in the first and second images G1 and G2 becomes 0, and the thus generated image for two-dimensional display may be two-dimensionally displayed on the monitor 20. Further, when the imaging units 21A and 21B end the zoom operation, the display control unit 28 switches the display from two-dimensional display to three-dimensional display. FIG. 3 is a diagram illustrating stereoscopic effects when the display is switched. As shown in FIG. 3, when the photographer starts the zoom control operation, the display is switched from three-dimensional display to two-dimensional display and the stereoscopic effect becomes 0. Then, when the photographer finishes the zoom control operation, the display is switched from two-dimensional display to three-dimensional display and the stereoscopic effect appears.

Figure 4:
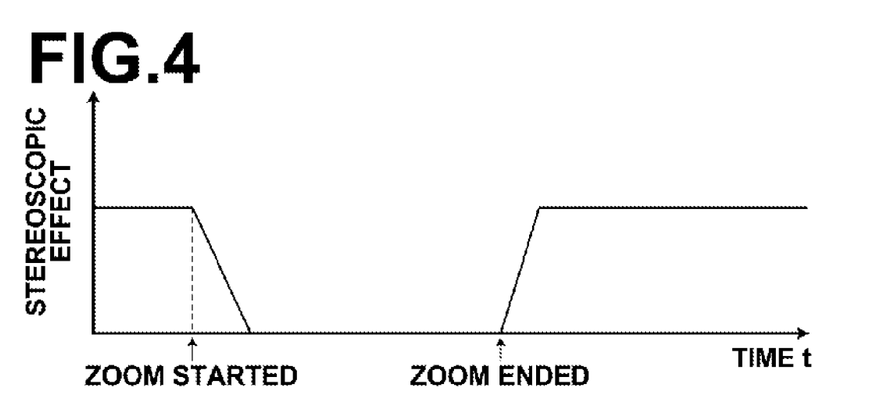
FIG. 4 is another diagram illustrating stereoscopic effects when display is switched.

It should be noted that switching of the display from three-dimensional display to two-dimensional display and from two-dimensional display to three-dimensional display may be carried out such that the stereoscopic effect is gradually changed. In this case, as shown in FIG. 4, when the photographer starts the zoom control operation, the display is gradually switched from three-dimensional display to two-dimensional display, and the stereoscopic effect gradually becomes 0. Then, when the photographer finishes the zoom control operation, the display is gradually switched from two-dimensional display to three-dimensional display, and the stereoscopic effect gradually appears.

Change of the stereoscopic effect when the display is switched from three-dimensional display to two-dimensional display may be achieved by applying the three-dimensional processing to gradually reduce the parallax, i.e., an amount of disparity, between first and second images G1 and G2. In contrast, change of the stereoscopic effect when the display is switched from two-dimensional display to three-dimensional display may be achieved by applying the three-dimensional processing to gradually restore the original parallax, i.e., the original amount of disparity, between the first and second images G1 and G2.

In addition to changing the amount of disparity between the first and second images G1 and G2, gradual change of the stereoscopic effect may be achieved by sequentially generating interpolation images from the first and second images G1 and G2 with using the first image G1 as a reference such that the parallax between the subject images contained in the first and second images G1 and G2 is gradually reduced, and carrying out, each time the interpolation image is generated, the three-dimensional processing using the first image G1 and each interpolation image and display of the image for three-dimensional display generated through the three-dimensional processing.

The CPU 33 controls the units of the stereoscopic camera 1 according to signals inputted via the input unit 34, which includes the release button, etc.

The data bus 35 is connected to the units forming the stereoscopic camera 1 and the CPU 33, and communicates various data and information in the stereoscopic camera 1.

Figure 5:
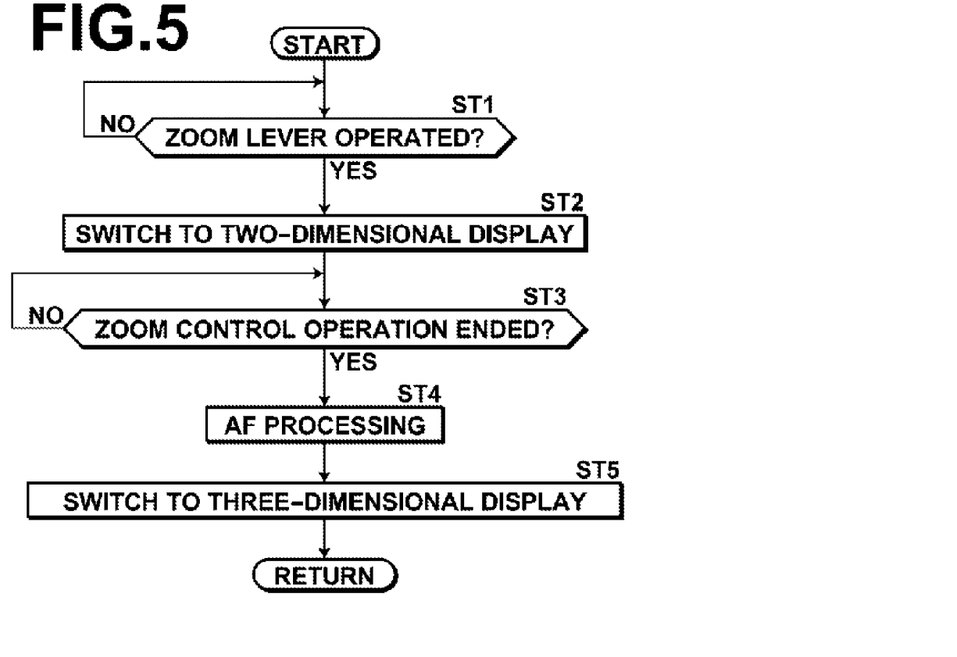
FIG. 5 is a flow chart illustrating a process carried out in the embodiment.

Next, a process carried out in this embodiment is described. FIG. 5 is a flow chart illustrating the process carried out in this embodiment. It is assumed here that the live view image of the first and second images G1 and G2 is three-dimensionally displayed on the monitor 20 of the stereoscopic camera 1 through the three-dimensional processing applied by the three-dimensional processing unit 30 to the first and second images G1 and G2 obtained by the imaging units 21A and 21B. Since the invention is characterized by a process carried out during the zoom operation of the imaging units 21A and 21B, only a process that is carried out when the zoom control operation is made using the zoom lever 34A while the live view image is displayed is described.

The CPU 33 monitors whether or not the photographer has operated the zoom lever 34A (step ST1). If the determination in step ST1 is affirmative, the imaging units 21A and 21B start the zoom operation, and the display control unit 28 switches the display to two-dimensional display where only the first image G1 is displayed on the monitor 20 (step ST2). Then, the CPU 33 starts monitoring whether or not the photographer has ended the zoom control operation (step ST3). If the determination in step ST3 is affirmative, the imaging units 21A and 21B stop the zoom operation, and the imaging control unit 22 performs the AF processing of the imaging units 21A and 21B (step ST4).

Subsequently, the display control unit 28 switches the display on the monitor 20 to three-dimensional display of the live view image (step ST5), and the process returns.

Then, when the release button is pressed to carry out imaging, the imaging units 21A and 21B obtain the actual images of the first and second images G1 and G2. Then, the three-dimensional processing unit 30 generates the image for three-dimensional display from the first and second images G1 and G2, the compression/decompression unit 24 generates the three-dimensional image file formed by image data of the first and second images G1 and G2 and the image for three-dimensional display, and the media control unit 26 records the three-dimensional image file in the recording medium 29.

As described above, in this embodiment, two-dimensional display is carried out while the imaging units 21A and 21B carry out the zoom operation. Therefore, no variation of the stereoscopic effect of the image displayed on the monitor 20 occurs during the zoom operation, thereby reliably alleviating the uncomfortable feeling felt due to variation of the stereoscopic effect during the zoom operation.

After the zoom operation is ended, the AF processing of the imaging units 21A and 21B is carried out, and then the display is switched to three-dimensional display. Therefore, the three-dimensional display is carried out with the first and second images G1 and G2 being in focus. Thus, after the zoom operation is ended, stereoscopic viewing can be achieved successfully.

Figure 6:
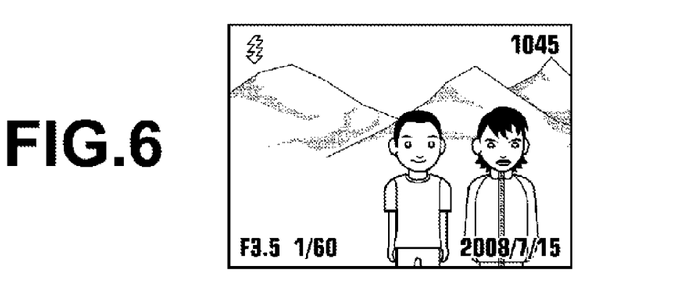
FIG. 6 is a diagram illustrating an image displayed with objects superposed thereon.

It should be noted that, in the above-described embodiment, while the live view image is displayed, objects may be superposed on the image. FIG. 6 is a diagram illustrating an image displayed with objects superposed thereon. Here, a state where objects are superposed on a two-dimensional image is shown for the purpose of explanation. As shown in FIG. 6, on the image displayed on the monitor 20, an object of an icon representing emission of flash light is superposed at the upper-left corner, an object of the number of images taken so far is superposed at the upper-right corner, an object of an F value and a shutter speed is superposed at the lower-left corner, and an object of a text showing the photographing date is superposed at the lower-right corner.

In this case, the objects can be three-dimensionally displayed to allow stereoscopic viewing by arranging the objects on each of the first and second images G1 and G2 such that a parallax is provided therebetween. In the case where the objects are three-dimensionally displayed like this, display of the objects may be switched from three-dimensional display to two-dimensional display while the imaging units 21A and 21B carry out the zoom operation, in the same manner as the first and second images G1 and G2. Thus, variation of the stereoscopic effect of the objects becomes small, thereby alleviating the uncomfortable feeling felt during the zoom operation.

Figure 7:
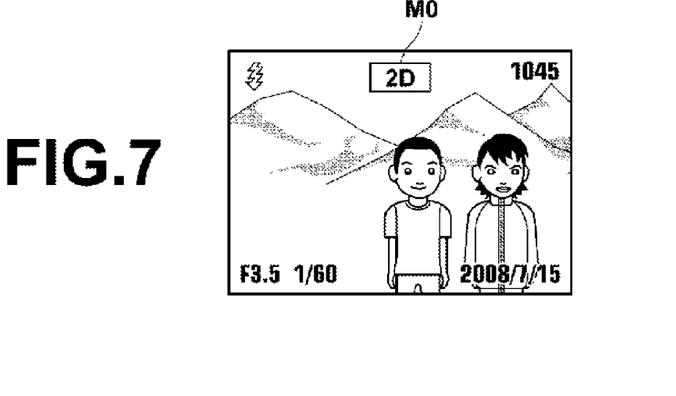
FIG. 7 is a diagram illustrating a state where a "2D" mark is displayed.

Further, since stereoscopic viewing cannot be performed when the display is switched from three-dimensional display to two-dimensional display in the above-described embodiment, the photographer may misunderstand this to be a failure of the device 1. Therefore, as shown in FIG. 7, the display control unit 28 may display a "2D" mark M0 on the monitor 20 to notify the photographer of the fact that two-dimensional display is being carried out. In this case, the display control unit 28 corresponds to a notification means. In this manner, the photographer can recognize, based on the mark M0, that two-dimensional display is being carried out. Alternatively, in place of displaying the mark M0, the device 1 may be provided with a sound output unit to use a sound to notify the photographer of the fact that two-dimensional display is being carried out. Further alternatively, both the sound and display of the mark M0 may be used to notify the photographer of the fact that two-dimensional display is being carried out.

Further, although the display is switched from three-dimensional display to two-dimensional display when the photographer has started the zoom control operation in the above-described embodiment, three-dimensional display with a smaller parallax may be carried out, in place of the two-dimensional display, by applying the three-dimensional processing with a reduced parallax between the first and second images G1 and G2.

The three-dimensional processing with a reduced parallax can be achieved by reducing a parallax, i.e., an amount of disparity, between subject images contained in the first and second images G1 and G2. The three-dimensional processing with a reduced parallax can also be achieved by morphing the first and second images G1 and G2 using the first image G1 as a reference to generate an interpolation image with a reduced parallax between subject images contained in the first and second images G1 and G2, and carrying out the three-dimensional processing using the first image G1 and the interpolation image.

Figure 8:
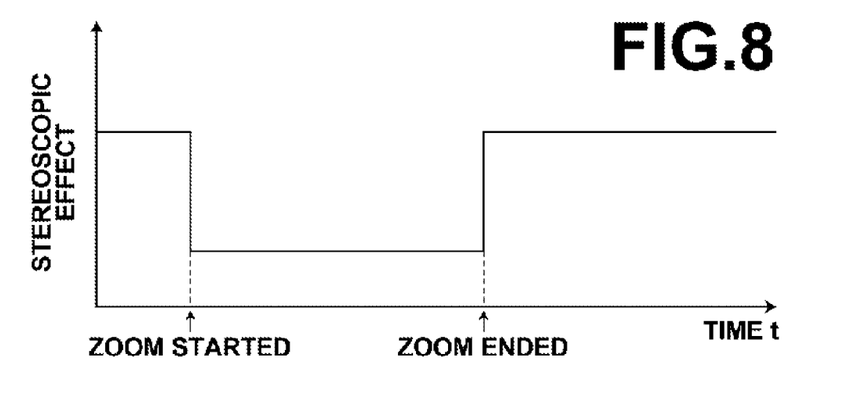
FIG. 8 is a diagram illustrating stereoscopic effects when display is switched in a case where a reduced parallax is used.
Figure 9:
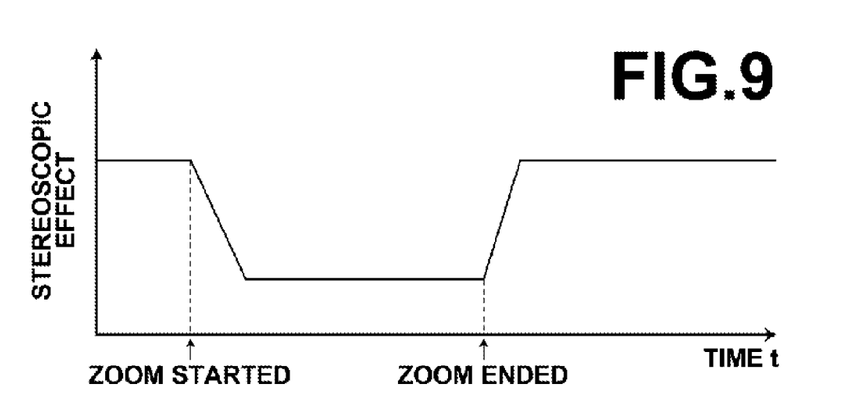
FIG. 9 is another diagram illustrating stereoscopic effects when display is switched in a case where a reduced parallax is used.

FIG. 8 is a diagram illustrating stereoscopic effects when the display is switched in the case where the three-dimensional processing with a reduced parallax is carried out. As shown in FIG. 8, when the photographer has started the zoom control operation, the stereoscopic effect of the three-dimensional display is reduced. Then, when the photographer has ended the zoom control operation, the stereoscopic effect is increased. In this case, the stereoscopic effect may be switched gradually, as shown in FIG. 9.

Figure 10:
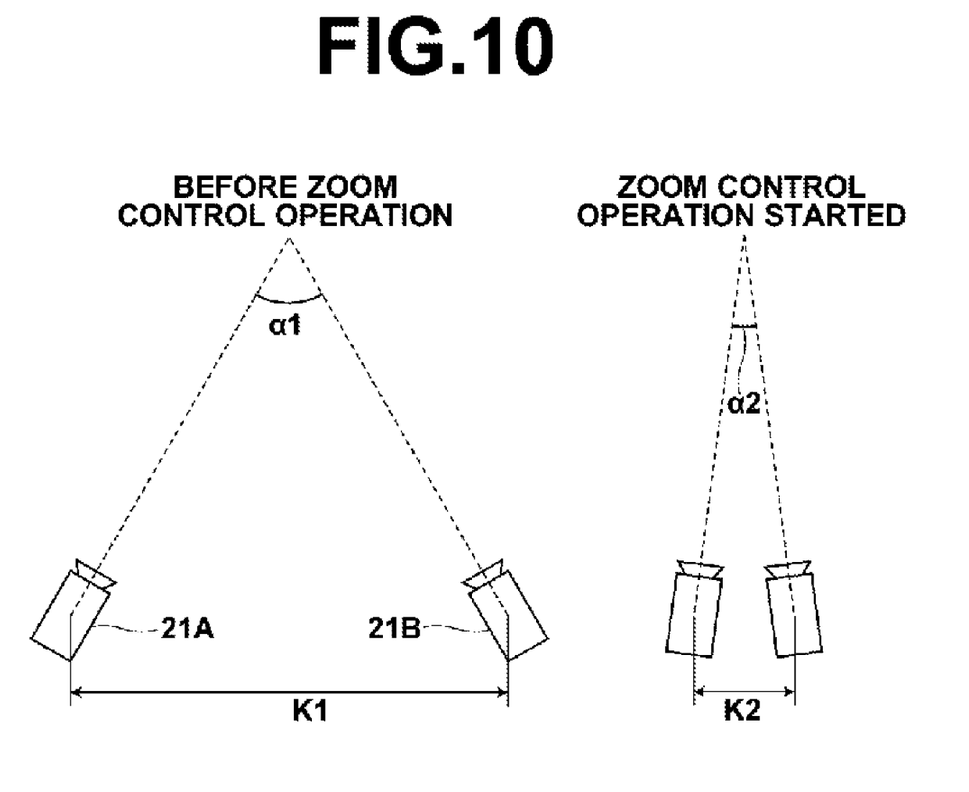
FIG. 10 is a diagram for explaining changes of a baseline length and a convergence angle of imaging units.

The parallax between the first and second images G1 and G2 can also be reduced by reducing a distance between the imaging units 21A and 21B. That is, as shown in FIG. 10, reduction of the parallax between the first and second images G1 and G2 can be achieved by changing, when the zoom control operation is started, a baseline length K1 and a convergence angle α1 between the imaging units 21A and 21B before the photographer starts the zoom control operation to a baseline length K2 and a convergence angle α2. The distance between the imaging units 21A and 21B may be changed using a known mechanism.

Further, although the stereoscopic camera 1 is provided with the two imaging units 21A and 21B and three-dimensional display is carried out using the two images G1 and G2 in the above-described embodiment, the invention is also applicable to a case where the stereoscopic camera 1 is provided with three or more imaging units and three-dimensional display is carried out using three or more images.

One embodiment of the present invention has been described. The invention may also be implemented in the form of a program for causing a computer to function as means corresponding to the display control unit 28 and the three-dimensional processing unit 30 described above and carry out the process as shown in FIG. 5. The invention may also be implemented in the form of a computer-readable recording medium containing such a program.

The invention claimed is:

1. A three-dimensional imaging device comprising:
two or more imaging units for obtaining two or more images having a parallax therebetween by imaging a subject from different positions, the two or more imaging units having an optical zoom function;
a three-dimensional processing unit for applying three-dimensional processing for three-dimensional display to the two or more images;
a display unit for carrying out various types of display including three-dimensional display of the two or more images; and
a display control unit for carrying out three-dimensional display by reducing the parallax between the two or more images while the imaging units carry out a zoom operation,
wherein in a case where an object, which is displayed on the display unit other than the images obtained through imaging of the subject, is three-dimensionally displayed with being superposed on the three-dimensionally displayed image, the display control unit carries out three-dimensional display by reducing the parallax while the imaging units carry out the zoom operation, and
wherein when the parallax is reduced, the parallax is reduced by ramping down from a first parallax to a second, smaller, non-zero parallax when the zooming operation begins, the parallax is maintained at the second, smaller, non-zero parallax during the zoom operation, and the parallax is increased by ramping up from the second, smaller parallax to the first parallax when the zoom operation is completed.

2. The three-dimensional imaging device as claimed in claim 1, wherein the three-dimensional processing unit carries out the three-dimensional processing with a reduced parallax while the imaging units carry out the zoom operation.

3. The three-dimensional imaging device as claimed in claim 1, further comprising a notification unit for notifying that the three-dimensional display with a reduced parallax or a two-dimensional display is being carried out.

4. The three-dimensional imaging device as claimed in claim 1, wherein the display control unit gradually reduces the parallax after the zoom operation is started until the parallax becomes 0 to finally carry out a two-dimensional display.

5. The three-dimensional imaging device as claimed in claim 1, wherein the display control unit gradually reduces the parallax after the zoom operation is started until the parallax becomes a predetermined parallax to finally carry out the three-dimensional display with a reduced parallax.

6. A three-dimensional imaging method for use with a three-dimensional imaging device including two or more imaging units for obtaining two or more images having a parallax therebetween by imaging a subject from different positions, the two or more imaging units having an optical zoom function, a three-dimensional processing unit for applying three-dimensional processing for three-dimensional display to the two or more images, and a display unit for carrying out various types of display including three-dimensional display of the two or more images, the method comprising:
carrying out three-dimensional display by reducing parallax between the two or more images while the imaging units carry out a zoom operation; and
in a case where an object, which is displayed on the display unit other than the images obtained through imaging of the subject, is three-dimensionally displayed with being superposed on the three-dimensionally displayed image, carrying out three-dimensional display by reducing parallax while the imaging units carry out the zoom operation, and
wherein when the parallax is reduced, the parallax is reduced by ramping down from a first parallax to a second, non-zero smaller parallax when the zooming operation begins, the parallax is maintained at the second, smaller, non-zero parallax during the zoom operation, and the parallax is increased by ramping up from the second, smaller non-zero parallax to the first parallax when the zoom operation is completed.

7. A non-transitory computer-readable storage medium with an executable program for causing a computer to carry out a three-dimensional imaging method for use with a three-dimensional imaging device including two or more imaging units for obtaining two or more images having a parallax therebetween by imaging a subject from different positions, the two or more imaging units having an optical zoom function, a three-dimensional processing unit for applying three-dimensional processing for three-dimensional display to the two or more images, and a display unit for carrying out various types of display including three-dimensional display of the two or more images, the program causing the computer to carry out the procedure of:
carrying out three-dimensional display by reducing parallax between the two or more images while the imaging units carry out a zoom operation; and
in a case where an object, which is displayed on the display unit other than the images obtained through imaging of the subject, is three-dimensionally displayed with being superposed on the three-dimensionally displayed image, carrying out three-dimensional display by reducing parallax while the imaging units carry out the zoom operation, and
wherein when the parallax is reduced, the parallax is reduced by ramping down from a first parallax to a second, smaller, non-zero parallax when the zooming operation begins, the parallax is maintained at the second, smaller, non-zero parallax during the zoom operation, and the parallax is increased from the second, smaller, non-zero parallax to the first parallax when the zoom operation is completed.

* * * * *